United States Patent [19]

Sage

[11] Patent Number: 5,080,572
[45] Date of Patent: Jan. 14, 1992

[54] SNOW BALL MAKING DEVICE
[75] Inventor: David Sage, Springfield, Mo.
[73] Assignee: Sagebrush Industries, Springfield, Mo.
[21] Appl. No.: 587,460
[22] Filed: Sep. 6, 1990

Related U.S. Application Data

[63] Continuation of Ser. No. 346,540, May 2, 1989, abandoned.

[51] Int. Cl.⁵ .............................................. B29C 33/26
[52] U.S. Cl. .................................... 425/276; 249/170; 425/318; 425/DIG. 57
[58] Field of Search ............... 425/318, DIG. 57, 276, 425/408, 412; 31/257, 259; 249/162, 170, 161, 160

[56] References Cited

U.S. PATENT DOCUMENTS

| | | | |
|---|---|---|---|
| 436,818 | 9/1890 | Wiatt et al. | 425/318 |
| 448,133 | 10/1891 | Cushing | 425/318 |
| 1,323,582 | 12/1919 | Dow | 425/318 |
| 1,515,623 | 11/1924 | Schott | 425/318 |
| 1,639,122 | 8/1927 | Whitman | 425/318 |
| 2,003,197 | 5/1935 | Jackson | 425/318 |
| 2,165,941 | 7/1939 | Price | 425/318 |
| 3,031,561 | 4/1962 | Shaffer | 425/318 |
| 3,137,894 | 6/1964 | Butler et al. | 425/318 |
| 3,289,246 | 12/1966 | Deye | 425/318 |
| 3,472,217 | 10/1969 | Erickson et al. | 124/5 |
| 3,590,749 | 7/1971 | Burns | 425/DIG. 57 |
| 3,836,308 | 9/1974 | Upright | 425/318 |
| 3,930,329 | 1/1976 | Burkhardt | 249/95 |
| 4,023,272 | 5/1977 | Siden et al. | 30/257 |
| 4,163,639 | 8/1979 | Stern et al. | 425/318 |
| 4,429,460 | 2/1984 | Hill et al. | 30/257 |
| 4,601,412 | 7/1986 | Martin | 222/324 |
| 4,859,167 | 8/1989 | Maerz et al. | 425/318 |

FOREIGN PATENT DOCUMENTS

| | | | |
|---|---|---|---|
| 803238 | 7/1949 | Fed. Rep. of Germany | 425/276 |
| 867931 | 10/1941 | France | 425/318 |
| 990273 | 9/1951 | France | 425/318 |
| 1006084 | 4/1952 | France | 425/318 |
| 13830 | of 1891 | United Kingdom | 425/318 |

Primary Examiner—Jay H. Woo
Assistant Examiner—Khanh P. Nguyen
Attorney, Agent, or Firm—Nixon & Vanderhye

[57] ABSTRACT

A snow ball making device is provided which includes a pair of elongated arms each of which has a first handle end and a second working end. These arms are pivotally secured to each other at a location intermediate their first and second ends, preferably within angled portions which connect longitudinally spaced parallel portions of the respective arms. The working end of each arm is provided with an open semi-spherical cup portion, such that the handle ends of the elongated arms are manipulable to move the semi-spherical cup portions between open and closed positions. In the closed position, the open semi-spherical cup portions are in flush engagement so as to insure the formation of a substantially spherical snow ball.

15 Claims, 2 Drawing Sheets

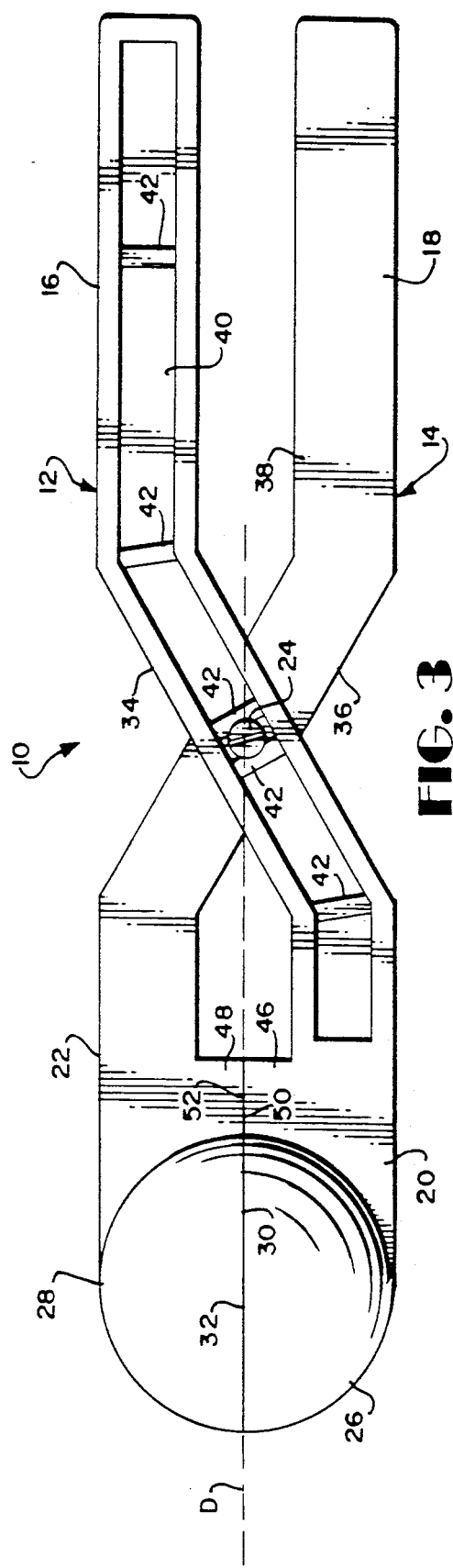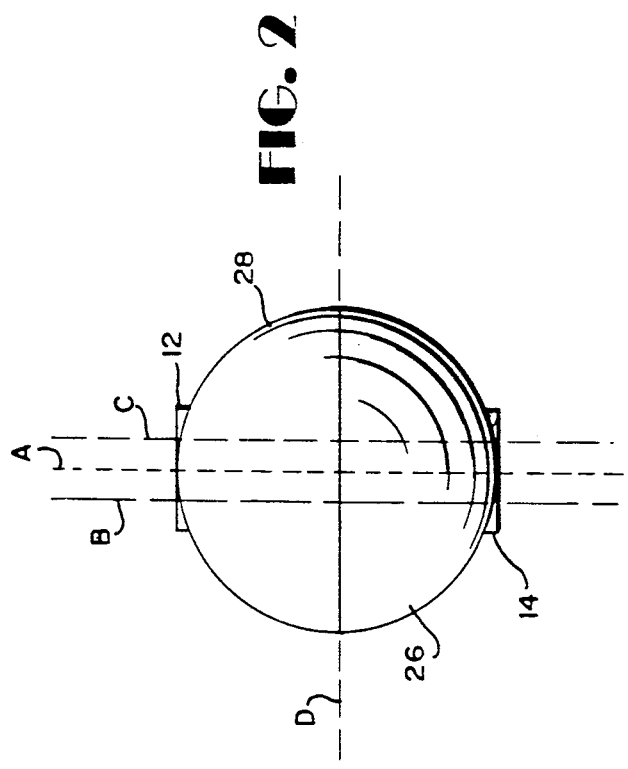

SNOW BALL MAKING DEVICE

BACKGROUND AND SUMMARY OF THE INVENTION

This invention relates generally to outdoor toys for winter time use, and specifically, to a hand manipulable snow ball maker. The device of this invention is designed particularly to insure the formation of virtually perfectly spherical snowballs, and to provide the leverage necessary to produce a well compacted ball of snow.

Snow ball making devices in general are known in the art. See, for example, U.S. Pat. No. 4,163,639, which discloses a pair of interfitting shell members having integral handle portions. The patent also suggests that the interfitting shells can be incorporated into a device having handles which may be pivoted at one end or which may be pivoted intermediate their ends.

U.S. Pat. No. 3,836,308 discloses a snow ball maker having two opposed semi-circular shells that interfit to form snow engaged between the shells into a ball.

The present invention seeks to improve upon prior known snow ball making devices by utilizing a durable, reinforced, scissors-type handle which incorporates a pair of identical, semi-spherical shells adapted to combine to form a spherical snow ball.

More specifically, in one exemplary embodiment of the invention, a snow ball making device is provided which comprises a pair of elongated arms each of which has a first handle end and a second working end. These arms are pivotally secured to each other at a location intermediate their first and second ends, preferably within angled portions which connect longitudinally spaced parallel portions of the respective arms. The working end of each arm is provided with an open semi-spherical cup portion, so that the handle ends of the elongated arms are manipulable to move the pair of semi-spherical cup portions between open and closed positions. In the closed position, the open semi-spherical cup portions are in flush engagement so as to insure the formation of a substantially spherical snow ball.

In one aspect of the present invention, first and second planes which pass through the center of the respective arms in a direction of elongation of the arms are parallel to each other, and to a third plane which passes through the center of the hollow sphere formed when the semi-spherical cup portions are in the closed position, and which is located between the first and second planes.

In another aspect of the invention, each of the open semi-spherical cup portions includes a smooth peripheral edge which, in the closed position, lies in a fourth plane extending perpendicular to the first, second and third planes, and which also passes through the pivot means connecting the elongated arms.

In another aspect of the present invention, the working ends of the arms are each provided with a reinforced portion adjacent the semi-spherical cup portions, configured such that the reinforced portions extend toward each other when the cup portions are in the closed position.

In still another aspect of the present invention, each of the elongated arms is provided with one side which is substantially smooth, and a second side which is substantially open channel shaped. In addition, the open channel shaped sides of the respective arms are provided with longitudinally spaced, transversely oriented reinforcing ribs.

It will be appreciated that the snow ball device of this invention may be made of any suitable material, but in a preferred arrangement, the device is constructed of a molded thermoplastic material. In addition, any suitable means may be utilized to effect a pivot connection between the respective handles. In a preferred arrangement, a conventional snap binding screw and associated end post are employed for this purpose.

Additional objects and advantages of the invention will become apparent from the detailed description which follows below.

BRIEF DESCRIPTION OF THE DRAWINGS

FIG. 2 is a front view of the snow ball making device illustrated in FIG. 1, but with the semi-spherical cup portions in a closed position; and FIG. 3 is a side view of the snow ball making device illustrated in FIG. 1, but with the semi-spherical cup portions in a closed position.

DETAILED DESCRIPTION OF THE DRAWINGS

Figure 1:
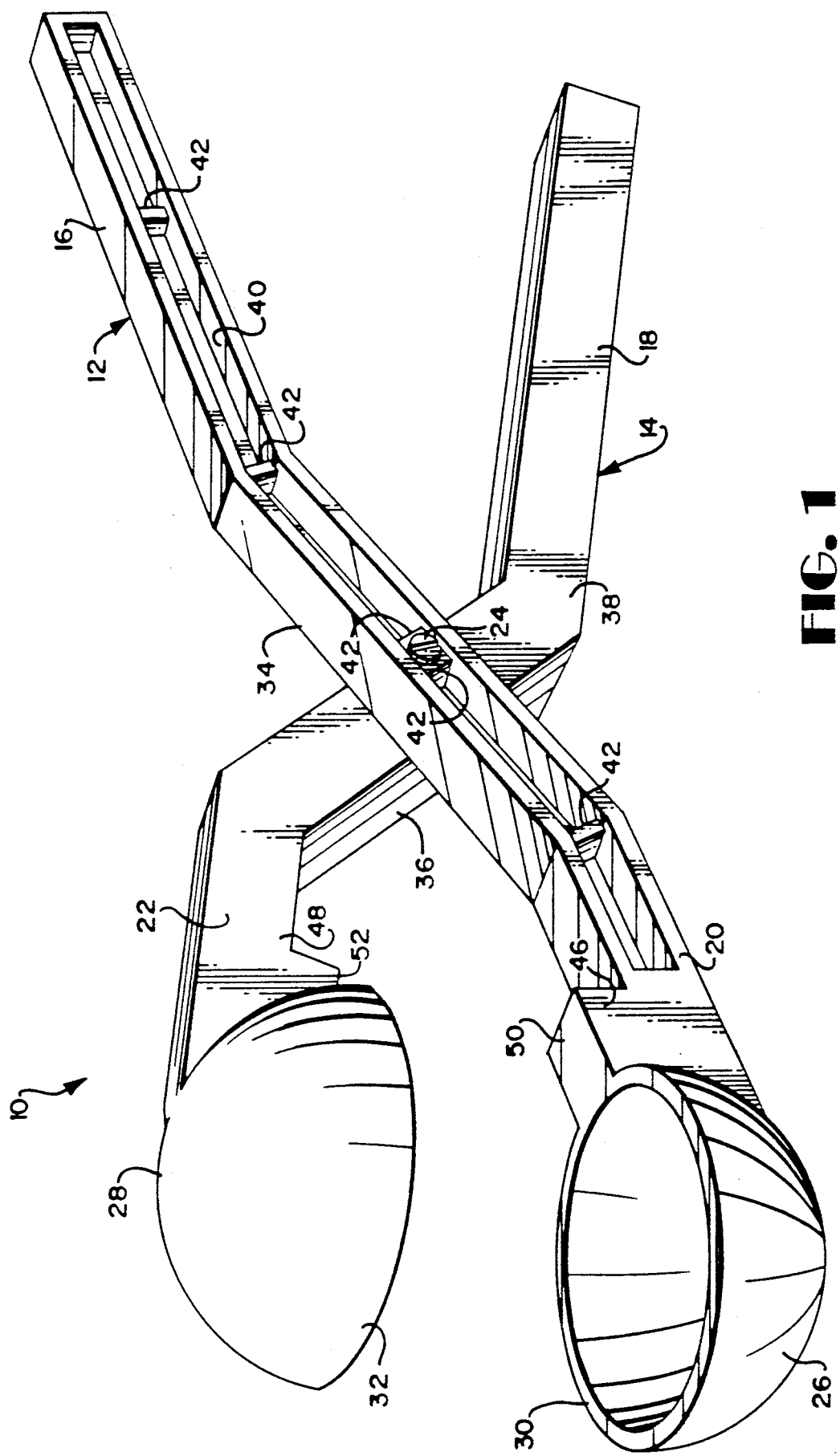
FIG. 1 is a perspective view of the snow ball making device in accordance with the invention with the semi-spherical cup portions in an open position.

With reference now to FIGS. 1 through 3, a snow ball making device 10 in accordance with an exemplary embodiment of the invention, includes a pair of elongated arms 12, 14 which are pivotally attached in the manner described below. The arms 12, 14 are provided with first handle ends 16, 18, and second working ends 20, 22, respectively. The arms are pivotally secured to each other by means of a conventional screw and post assembly, partially illustrated at 24 in FIGS. 1 and 3.

The elongated arm 12 is provided at its working end 20 with an open, semi-spherical cup or shell 26, while the arm 14 is provided at its working end 22 with an identical open, semi-spherical cup or shell 28. These semi-spherical cups or shells are provided about their open peripheries with smooth annular edges 30, 32, respectively, which are adapted for flush engagement with each other when the cups or shells 26, 28 are moved to a closed position by the appropriate manipulation of the arms 12, 14 via handle ends 16, 18, respectively, as best seen in FIGS. 2 and 3.

From the figures it will be apparent that the handle end 16 and working end 20 of arm 12 extend parallel to each other, and are interconnected by an angled portion 34, while the handle end 18 and working end 22 of arm 14 also extend parallel to each other, and are interconnected by a similar angled portion 36. The pivot means 24 extend through apertures formed in these angled portions 34, 36, substantially at the mid-point thereof.

As best seen in FIGS. 1 and 3, the elongated arms are each provided with a smooth surface 38 on one side, and an open channel configuration 40 on the opposite side, such that smooth surfaces 38 of each arm face each other. At longitudinally spaced positions along the open channel side, and including on either side of the pivot means 24 there are provided generally cross-wise extending reinforcing ribs 42.

Arms 12, 14 are also provided with reinforced portions 46, 48, respectively, at the juncture of the arms and the semi-spherical cups or shells 26, 28. These reinforced portions include substantially flat surfaces 50, 52 which face and lie adjacent each other when the semi-spherical cups or shells are in a closed position as best seen in FIG. 2.

With specific reference to FIG. 2, it may be seen that the arms are eccentrically joined to the semi-spherical cup portions. This arrangement assures accurate alignment between the semi-spherical cup portions as they move to the closed position. More specifically, a vertical (as illustrated in the figure) plane A passes through the center of the device including the center of a hollow sphere formed by the semi-spherical cups or shells 26, 28 when moved to the closed position. A vertical plane B extends through the longitudinal axis of the elongated arm 14, parallel to the plane A but offset to one side thereof. In the same manner, a plane C passes through the longitudinal axis of the elongated arm 12 but offset to the other side of plane A so that all three planes A, B and C extend parallel to one another in laterally spaced relationship.

It will further be appreciated that in the closed position, the surfaces 50, 52, edges 30 and 32 of the semi-spherical shells 26, 28, respectively, and the pivot pin 24 all lie within a common plane D.

From the above construction, it will be appreciated that the design of the snow ball making device in accordance with a preferred embodiment of this invention, provides a strong, sturdy, and durable device which provides good leverage necessary for forming substantially spherical, well compacted snow balls. In this regard, the reinforced areas 46, 48 insure that the sphere formed by the semi-spherical cup or shell portions 26, 28 is supported throughout substantially 180° of its 360° circumference. This arrangement provides strength, durability and stability for the device.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A snow ball making device comprising:
   first and second elongated arms having longitudinal axes lying, respectively, in first and second parallel planes, each arm having a first handle end and a second working end, said arms being pivotally secured to each other at a location intermediate said first and second ends, said working ends each provided with an open semi-spherical cup portion having a single annular peripheral edge, each arm being joined asymmetrically to said semi-spherical cup portion and wherein said handle ends are manipulable to move said cup portions between open and closed positions such that, in the closed position, said annular peripheral edges abut each other to form a closed, hollow sphere having a center lying in a third plane located between and parallel to said first and second planes.

2. A snow ball making device as defined in claim 1 wherein, in the closed position, said peripheral edges lie in a fourth plane extending substantially perpendicular to said first, second and third planes.

3. A snow ball making device as defined in claim 1 wherein each arm comprises a molded plastic member having two substantially parallel portions connected by an intermediate angled portion, and wherein said arms are pivotally secured in said intermediate angled portions.

4. A snow ball making device as defined in claim 1 and wherein said working ends are each provided with a reinforced portion where said working ends join with said open semi-spherical cup portions.

5. A snow ball making device as defined in claim 4, and wherein said reinforced portions extend toward each other when said semi-spherical cup portions are in the closed position, and collectively extend over substantially 180° of the circumference of the closed hollow sphere.

6. A snow ball making device as defined in claim 1 wherein said device is constructed of plastic.

7. A snow ball making device as defined in claim 5 wherein said device is constructed of plastic.

8. A snow ball making device as defined in claim 1 wherein each arm has a substantially smooth side and a substantially open channel shaped side extending substantially the entire length thereof, and wherein said substantially smooth sides face each other.

9. A snow ball making device as defined in claim 8 and wherein said substantially open channel shaped sides of said arms are provided with longitudinally spaced, transversely oriented reinforcing ribs.

10. A snow ball making device as defined in claim 9 wherein said arms are pivotally secured by pivot means extending between a pair of said transversely oriented reinforcing ribs.

11. A snow ball making device comprising a pair of elongated arms each having first and second ends, said arms being secured to each other at a location intermediate said first and second ends by pivot means such that said arms lie adjacent one another in parallel planes extending perpendicular to an axis of rotation formed by said pivot means;
   a pair of identical, open semi-spherical shell members attached, respectively, at one of said first and second ends of each of said arms, each of said shell members having a smooth annular edge at the open end thereof having a diameter of about three inches, such that when said open semi-spherical shell members are moved to a closed position, said smooth annular edges abut in a plane extending through said pivot means to form a closed, hollow spherical space, said device having an overall length of about fifteen inches.

12. A snow ball making device comprising:
   identical semi-spherical shell means for forming a compressed, spherical snow ball; and
   offset, elongated arm members attached to each other intermediate respective ends thereof by pivot means, said arm members joined to said semi-spherical shell means and manipulable to move said semi-spherical shell means between disengaged and engaged positions, said semi-spherical shell means having smooth annular edges which, in said engaged position, abut each other in a first plane passing through said pivot means such that in said engaged position, said shell means abut to form a closed hollow sphere, and wherein means are provided on each of said arms for reinforcing junctures of said semi-spherical shell means and said elongated arm members, respectively; said reinforcing means lying, respectively, on either side of a second plane extending substantially perpendicular to said first plane.

13. A snow ball making device as defined in claim 12 wherein each arm comprises an extruded plastic member having two substantially parallel portions connected by an intermediate angled portion, and wherein said arms are pivotally secured in said intermediate angled portions.

14. A snow ball making device as defined in claim 13 wherein said reinforcing means each includes a flat surface which, in said engaged position, lies substantially along said first plane passing through said pivot means.

15. A snow ball making device as defined in claim 14 wherein each of said semi-spherical shell means has a circumferential surface extending substantially 180°, and wherein each of said reinforcing means engages said circumferential surface along substantially 90° thereof.

* * * * *